United States Patent Office 2,713,048
Patented July 12, 1955

2,713,048

PYRIDYL THENYLAMINES

Arthur W. Weston, Waukegan, Ill., assignor to Abbott Laboratories, North Chicago, Ill., a corporation of Illinois No Drawing. Application March 9, 1950,
Serial No. 148,524

23 Claims. (Cl. 260—294.8)

This application is a continuation-in-part of my prior applications, Serial No. 703,719, filed October 17, 1946, now Patent No. 2,556,566, and Serial No. 776,155, filed September 25, 1947, now abandoned.

My invention relates to new compositions of matter, and more particularly to certain heterocyclic compounds containing the thiophene ring. These compounds are α-pyridyl-α-thenylamines of the following formula:

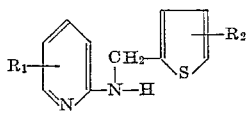

wherein $R_1$ is hydrogen or an alkyl group containing from 1 to 4 carbon atoms inclusive, $R_2$ is hydrogen, an alkyl group containing from 1 to 4 carbon atoms inclusive or a halogen atom such as chlorine, bromine and iodine. My invention also includes the discovery of efficient and novel processes for the preparation of the compounds of this series.

The α-pyridyl-α-thenylamines of the present invention are important intermediates in the preparation of the alkylenediamines disclosed in my prior applications, Serial Numbers 703,719 and 776,155. These compounds are of the formula:

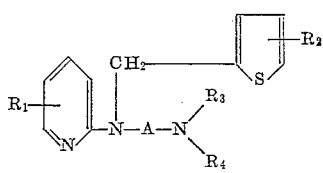

In these compounds $R_1$ and $R_2$ have the same definitions as given above, A is an alkylene hydrocarbon group containing from 2 to 11 carbon atoms inclusive, and $R_3$ and $R_4$ are hydrogen or alkyl or aralkyl groups and may together form part of a ring. $R_3$ and $R_4$ taken together have a total of not more than 11 carbon atoms. These alkylenediamines have received wide acclaim as antihistaminic agents and have shown some value as possible agents for early treatment of the common cold. The most important of these compounds are N-(α-pyridyl)-N-(α-thenyl)-N',N'-dimethylethylenediamine, N-(α-pyridyl)-N-(α'-bromo-α-thenyl)-N',N'-dimethylethylenediamine, N-(α-pyridyl)-N-(α'-chloro-α-thenyl)-N'-, N'-dimethylethylenediamine.

The α-pyridyl-α-thenylamines of the present application are useful for the novel, efficient and superior process for preparing these antihistamines by condensing the α-pyridyl-α-thenylamines with an ω-$R_3$, $R_4$-N-A-Halide.

The novel α-pyridyl-α-thenylamines of the present invention have been prepared by several novel processes. The first of these processes involves the treatment of an alkali-metal derivative of an α-aminopyridine with the suitably substituted α-thenyl-halide. This reaction may be illustrated as follows:

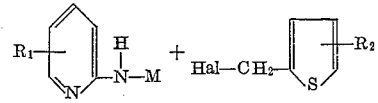

wherein $R_1$ and $R_2$ have the same definitions as before, M defines an alkali-metal and Hal is a halogen atom.

The use of the thenylhalides, however, is subject to certain disadvantages. By their nature, most of the thenylhalides have a tendency to polymerize forming a tar which makes isolation and purification of the desired compound tedious and complicated. Also, since the thenylhalides are expensive, the loss of this reagent due to polymerization increases the cost of the intermediate. Accordingly, I have now found another process which eliminates this difficulty and which in its general nature and with certain modifications, will produce the α-pyridyl-α-thenylamines in a more efficient manner and in greater yields. Thus, there results a substantial reduction in cost for the preparation of these compounds. My process involves in general the following reaction.

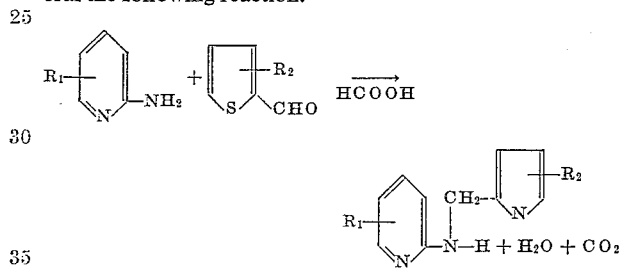

I have found that it is advantageous in the present process to use the α-aminopyridine and the α-thiophene-carboxaldehyde in either a ratio of 1 mole of α-aminopyridine to 1 mole of α-thiophenecarboxaldehyde, or with 2 moles of the α-aminopyridine to 1 mole of the α-thiophenecarboxaldehyde.

When a mole for mole ratio is used, I have found that the Schiff's base, α-pyridyl-α-thenylamine, is formed in slightly less than quantitative yields. This is shown by the following reaction.

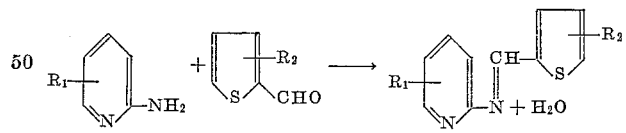

This compound may then be reduced with formic acid in accordance with the following reaction.

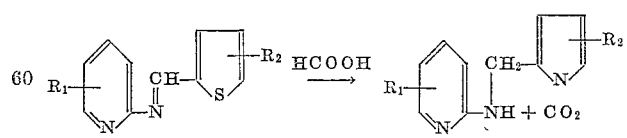

This reduction takes place in very high yield. It is not necessary that the Schiff's base be isolated prior to reduction. In fact, the overall yields are better if the crude Schiff's base is reduced directly without isolation.

Alternately, it is equally satisfactory to use 2 moles of the α-aminopyridine for each mole of α-thiophenecarboxaldehyde. In this case, the intermediate formed is N,N'-(α-thenylidinebis)-α-aminopyridine. Upon reduction with formic acid, the desired compound is formed.

This series of reactions may be indicated by the following reactions:

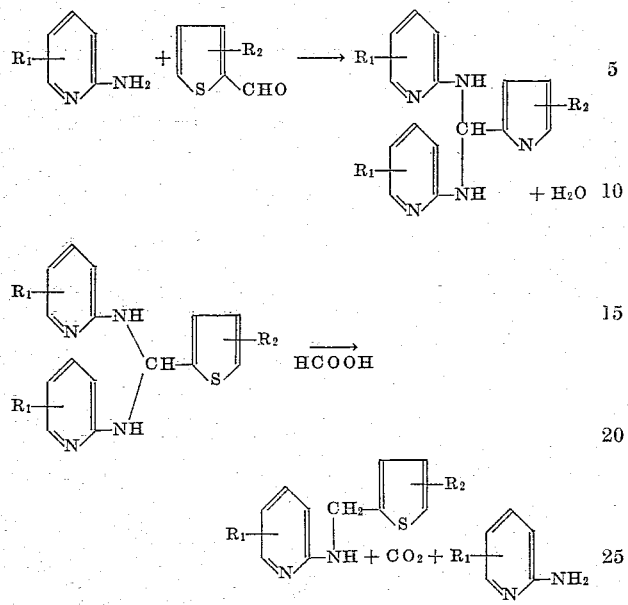

The yields using this process are quite high and are almost quantitative. Upon reduction of the N,N-(α-thenylidine-bis)-α-aminopyridine, a mole of α-aminopyridine is liberated which may be easily recovered. I have also found that it is particularly advantageous that there be approximately 1¼ mole of formic acid for each mole of the α-aminopyridine used in effecting the reduction in the above process.

I have also found that it is advantageous that anhydrous formic acid be used rather than commercial formic acid which usually contains approximately 10% water.

I have also discovered that it is advisable to distill off the water formed from the reaction of the α-aminopyridine and the α-thiophenecarboxaldehyde. This can be accomplished by conducting the process under conditions of distillation or with the conventional water separator.

I have discovered that there is an advantage to condense the α-aminopyridine and the α-thiophenecarboxaldehyde before the addition of formic acid. This greatly enhances the yields obtained and some of the difficulties in purification are removed.

The addition of small amounts of phosphorus oxychloride in the condensation of the aldehyde and amine greatly accelerates the reaction of this aldehyde and amine. The use of acids such as the so-called mineral acids, phosphoric, hydrochloric and sulfuric acids will achieve the same result to a lesser degree.

The formation of the Schiff's base initially, followed by reduction with formic acid, has been found to be advantageous as stated above. That the Schiff's base formed then reduces directly with formic acid is rather unexpected. For instance, there is disclosed in a recent publication, Journal of the American Chemical Society, vol. 70, page 1188 (1948) a statement that benzalaniline could not be reduced with formic acid but rather formed a tar with the production of little or benzylaniline. Since the present compounds are fairly similar to the compounds disclosed in this publication, it is unexpected that the reduction of the present Schiff's base would take place without the formation of a tar.

The novel thiophenecarboxaldehydes used in my process are disclosed and processes for their production are disclosed in my copending application, Serial No. 92,961, filed May 12th, 1949, now Patent No. 2,601,479.

In order to disclose more clearly the nature of the present invention, several specific examples illustrating the preparation of typical compounds will hereinafter be described in considerable detail. It should be understood, however, that this is done solely by way of example and is intended neither to delineate the scope of the invention nor limit the ambit of the appended claims.

EXAMPLE 1

α-Pyridyl-α-thenylamine

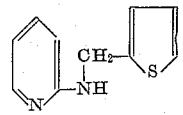

The sodio derivative of α-aminopyridine is prepared by adding 95 g. of this amine to 200 cc. of boiling toluene containing 40 g. of sodamide. This mixture is refluxed and stirred for one hour, then 66 g. of α-thenyl chloride is added and the heating and stirring continued for several hours longer. Water is added and the toluene layer separated. The water washings are saturated with potassium carbonate and extracted with ether. The ether extracts and the toluene layer are combined, dried and distilled. There is a forerun consisting of 53 g. of recovered α-aminopyridine. The product, α-pyridyl-α-thenylamine, distills at 160–165° C. at 3 mm. It solidifies on standing.

EXAMPLE 2

α-Pyridyl-α-thenylamine may also be prepared as follows:

About 8.1 g. of α-aminopyridine, 9.6 g. of α-thiophenecarboxaldehyde and 16 cc. of anhydrous formic acid are refluxed for eight hours in an atmosphere of nitrogen. The reaction mixture is neutralized with an alkali such as sodium hydroxide and the resultant aqueous portion extracted with ether. The ether extracts and the original oils are combined and extracted with an acid, such as hydrochloric. The α-pyridyl-α-thenylamine is regenerated by treatment with alkali and extracted into ether. The ether is removed by evaporation or distillation. The residue is purified by vacuum distillation, collecting the fraction which boils at 159–161° C. at 3.5 mm. pressure. The compound solidifies and has a melting point of 80–83° C. after crystallization from cyclohexane. I have observed that the yields are improved by using approximately a molar proportion of formic acid for a molar ratio of the other two reactants.

The modification of the process disclosed in Example 2 for preparing α-pyridyl-α-thenylamine using a mole for mole ration of α-aminopyridine and α-thiophenecarboxaldehyde to prepare the corresponding Schiff's base, followed by reduction with approximately 1 mole of formic acid is illustrated by the following example.

EXAMPLE 3

A solution of about 56 g. of α-thiophenecarboxaldehyde and 47 g. of α-aminopyridine in 150 cc. of toluene, contained in a 500 cc. flask equipped with a conventional water separator, is refluxed until the theoretical amount of water is collected. The addition of a few drops of phosphorus oxychloride to the refluxing solution of the reactants considerably reduces the time required for the condensation. The toluene solution is concentrated and the residue distilled whereby an excellent yield of product boiling at 148° at 1.6 mm. is obtained. This material which is the Schiff's base, α-pyridyl-α-thenalamine, solidifies on standing and melts at 56–57° C. after crystallization from cyclohexane.

A mixture of about 19.0 g. of α-pyridyl-α-thenylamine prepared above and 5.5 g. of formic acid (98–100%) is heated on the steam bath for a few hours then poured into dilute hydrochloric acid. The acidic solution is extracted with ether then made basic with sodium hydroxide. The base which is thus liberted is extracted with an ether-benzene mixture. The extracts are dried, concentrated and the residue distilled. The product boils at 128–129° C. at 0.8 mm. and melts at 80–82° C.

after crystallization from cyclohexane. The yield is excellent. The mono-hydrochloride of this amine melts at 131–132.5° C. The mono-hydrobromide melts at 108–109° C.

This product may also be obtained without isolating the intermediate Schiff's base. After the theoretical amount of water has been collected, as described in the preparation of α-pyridyl-α-thenylamine, the toluene may be removed. To this residue the formic acid is added and the operations completed as outlined above. In practice, the overall yields are much better if the Schiff's base is not purified but is reduced directly in the crude state.

That modification of the process for preparing α-pyridyl-α-thenylamine using 2 moles of α-aminopyridine for each mole of α-thiophenecarboxaldehyde is illustrated by the following example.

EXAMPLE 4

A solution of about 56 g. of α-thiophenecarboxaldehyde and 94 g. of α-aminopyridine in 50 cc. of toluene, contained in a 500 cc. flask equipped with a conventional water separator, is refluxed until the theoretical amount of water is collected. The time required for the condensation is reduced by adding a few drops of phosphorous oxychloride to the above refluxing solution. The toluene solution is concentrated and the residue distilled and isolated by collecting the fraction boiling at approximately 158° C. at 1.0 mm. pressure. This product is N,N'-(α-thenylidinebis)-α-aminopyridine, which melts at 79–81° C. after crystallization from cyclohexane.

A mixture of about 28.2 g. of N,N'-(α-thenylidinebis)-α-aminopyridine prepared above and 11.5 g. of formic acid (98–100%) is heated on a steam bath for a few hours, then poured into dilute hydrochloric acid. Proceeding as indicated in Example 3, α-pyridyl-α-thenylamine is produced in an almost quantitative yield. This reaction also produces 1 mole of α-aminopyridine which may be recovered as a forearm in the distillation.

EXAMPLE 5

*N-(α-pyridyl)-N-(α'-bromo-α-thenyl)-amine*

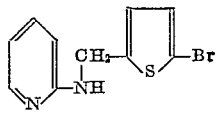

A mixture of about 34.4 g. of α'-bromo-α-thiophenecarboxaldehyde, 18.8 g. of α-aminopyridine and 40.5 g. of anhydrous formic acid is refluxed for 8 hours. The reaction mixture is then made acidic and any unreacted aldehyde removed by shaking with ether. The addition of alkali to the acidic solution liberates the basic product which is then dissolved in ether and later combined with the subsequent ether extracts of the basic solution. The ether solution is washed well with water, dried, and concentrated by evaporation of the ether and distilled.

The product N-(α-pyridyl)-N-(α'-bromo-α-thenyl)-amine has a boiling point of 182–185° C. at 2.5 mm, pressure. The product solidifies and on crystallization from cyclohexane melts at 83–85° C.

EXAMPLE 6

*N-(α-pyridyl)-N-(α'-chloro-α-thenyl)-amine*

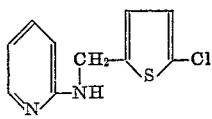

By using a mixture of about 73.3 grams of α'-chloro-α-thiophenecarboxaldehyde, 48.9 grams of α-aminopyridine and 92 grams of anhydrous formic acid, and proceeding according to Example 5, the above product is obtained which has a boiling point of 154–6° C. at 1.4 mm. pressure. After recrystallization from cyclohexane, this compound has a melting point of 83–6° C.

By using the various process details indicated in Examples 1 to 6, and using α'-methyl-α-aminopyridine rather than α-aminopyridine and using α'-methyl-α-thiophenecarboxaldehyde in place of α-thiophenecarboxaldehyde, the compound N-(α'-methyl-α-pyridine)-N-(α'-methyl-α-thenyl)-amine is produced. With α'-n-butyl-α-aminopyridine and α'-n-butyl-α-thiophenecarboxaldehyde, the compound N-(α'-n-butyl-α-pyridyl)-N-(α'-n-butyl-α-thenyl)-amine is produced.

For the purposes of this application the term halogen may be construed to include chlorine, bromine and iodine.

Others may readily adapt the invention for use under various conditions of service, by employing one or more of the novel features disclosed, or equivalents thereof. As at present advised with respect to the apparent scope of my invention, I desire to claim the following subject matter.

I claim:

1. α-Pyridyl-α-thenylamines of the formula:

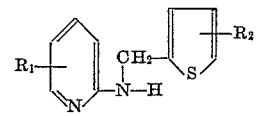

wherein $R_1$ is a member selected from the class consisting of hydrogen, an alkyl group containing from 1 to 4 carbon atoms inclusive, $R_2$ is a member selected from the class consisting of hydrogen, an alkyl group containing from 1 to 4 carbon atoms inclusive, and a halogen atom.

2. The compound N-(α-pyridyl)-N-(α'-bromo-α-thenyl)amine of the formula:

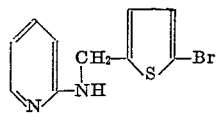

3. The compound N-(α-pyridyl)-N-(α'-chloro-α-thenyl)amine of the formula:

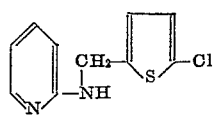

4. The process of producing α-pyridyl-α-thenylamines according to claim 1 which comprises condensing an α-thiophenecarboxaldehyde with an α-aminopyridine in the presence of essentially anhydrous formic acid.

5. The process according to claim 4 in which the reaction is carried out in the presence of an acid-catalyst.

6. Process according to claim 5 in which the acid-catalyst is phosphorus oxychloride.

7. The process according to claim 4 in which the formic acid, the α-thiophenecarboxaldehyde and the α-aminopyridine are reacted in mole-for-mole proportions.

8. Process according to claim 4 in which the water is removed immediately upon formation during the condensation.

9. The process of producing α-pyridyl-α-thenylamines according to claim 1, which comprises condensing an α-thiophenecarboxaldehyde with an α-aminopyridine followed by reducing the Schiff's base thus formed with essentially anhydrous formic acid.

10. Process according to claim 9 in which the reagents are used in mole-for-mole proportions.

11. Process according to claim 9 in which the water is removed immediately upon formation during the condensation.

12. The process of producing α-pyridyl-α-thenylamines according to claim 1, which comprises condensing 2 moles of an α-aminopyridine with 1 mole of α-thiophenecarboxaldehyde followed by reduction of intermediate formed with essentially anhydrous formic acid.

13. Process according to claim 12 in which approximately 1¼ mole of formic acid is used for each mole of α-aminopyridine used.

14. Process according to claim 12 in which the water is removed immediately upon formation during the condensation.

15. Process for producing α-pyridyl-α-thenylamine, which comprises condensing 2 moles of α-aminopyridine with 1 mole of α-thiophenecarboxaldehyde followed by reducing the intermediate formed with essentially anhydrous formic acid.

16. Process according to claim 15 in which 2 moles of formic acid are employed.

17. A compound represented by the following formula:

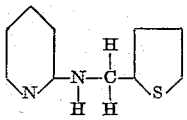

18. A process of producing α-pyridyl α-thenylamine which comprises reacting α-thiophenecarboxaldehyde and α-aminopyridine and reducing with essentially anhydrous formic acid to obtain α-pyridyl α-thenylamine.

19. A process according to claim 18 in which one mole of formic acid is used for each mole of α-thiophenecarboxaldehyde.

20. A process according to claim 18 in which the reagents are used in mole-for-mole proportions.

21. A process of producing α-pyridyl-α-thenylamine which comprises reacting α-thiophenecarboxaldehyde and α-aminopyridine in the presence of essentially anhydrous formic acid.

22. A process of producing α-pyridyl-α-thenylamine which comprises reacting α-thiophenecarboxaldehyde and α-aminopyridine followed by reducing the base thus formed with essentially anhydrous formic acid to obtain α-pyridyl-α-thenylamine.

23. A process of producing α-pyridyl-α-thenylamines according to claim 1, which comprises reacting an α-thiophenecarboxaldehyde and an α-aminopyridine and reducing with essentially anhydrous formic acid.

References Cited in the file of this patent

UNITED STATES PATENTS 2,502,151    Horclois               Mar. 28, 1950

OTHER REFERENCES

Bernthsen and Sudborough, Org. Chem., p. 549 (1922 ed.), D. Van Nostrand Co., New York, N. Y.

Lands, Proc. Soc. Exptl. Biol. Med., 57, 55–56 (1944).

Alles, J. Pharm. and Exp. Ther. 72, 265 (1941).

Powers, Advancing Fronts in Chemistry, vol. II, p. 33 (1946), Reinhold Pub. Co., New York, N. Y.

Whitmore, Org. Chem., p. 893 (1937) Van Nostrand, New York, N. Y.

Richter, Org. Chem., pp. 649–50 (1938) Wiley, New York, N. Y.